June 5, 1923.
H. MORRIS
DRESSING TOOL FOR EMERY WHEELS
Filed Aug. 26, 1920
1,457,452
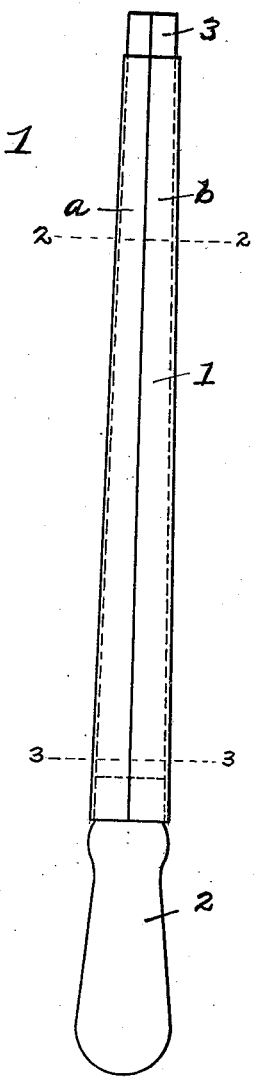
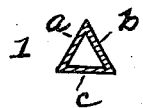
Henry Morris Inventor
By Staley & Bowman
Attorneys Patented June 5, 1923.

1,457,452

UNITED STATES PATENT OFFICE.

HENRY MORRIS, OF SPRINGFIELD, OHIO, ASSIGNOR TO THE WESTERN TOOL & MANUFACTURING COMPANY, OF SPRINGFIELD, OHIO, A CORPORATION OF OHIO.

DRESSING TOOL FOR EMERY WHEELS.

Application filed August 26, 1920. Serial No. 406,177.

*To all whom it may concern:*

Be it known that I, HENRY MORRIS, a citizen of the United States, residing at Springfield, in the county of Clark and State of Ohio, have invented certain new and useful Improvements in Dressing Tools for Emery Wheels, of which the following is a specification.

This invention relates to improvements in tools for dressing emery wheels or the like, it more particularly relating to a tool of this character which has an enclosing metallic casing for the abrading material.

An object of my invention is to provide a tool of the kind referred to so designed as to cause the working end of the abrading material to be of a self-sharpening character and thereby maintain it in a form to secure the best results in the dressing operation.

A further object of my invention is to provide a casing for the abrading material which will enable the tool to be more conveniently and accurately manipulated by furnishing flat bearing faces for the same to thereby permit the abrading material to be conveniently and easily held in proper working relation with the emery wheel or other device being dressed.

In the accompanying drawings:—

Fig. 1 is a side elevation of a tool embodying my improvements.

Fig. 2 is a section on the line 2—2 of Fig. 1 with the abrading material omitted.

Fig. 3 is a section on the line 3—3 of Fig. 1 with the abrading material omitted.

Referring to the drawings, 1 represents the metallic casing, 2 a handle secured in one end thereof, and 3 an abrading stick of any well-known abrasive material placed in the casing in any well known and suitable manner.

In order to accomplish the purposes of my invention, I construct the metallic casing, which is of sheet metal and of the usual tapered form, with a plurality of flat sides or faces, the preferable form, and the form which I have shown in the drawings, being one which is triangular in shape so that three faces, $a$, $b$, and $c$ are provided.

In operation, these flat faces not only furnish a firm bearing surface upon the support provided for the tool when in operation so as to prevent the tool from rotating, but the form of the casing also permits the use of a similarly-shaped stick of abrading material so that the working end of the material may be maintained in sharpened condition; or, in other words, the form of the material permits it to be self-sharpening in character. It will be understood that the abrading material, in whatever form it is inserted in the metallic casing, will completely fill the casing so that the exposed part of the abrading material as the casing is ground away will be of a character which embodies a plurality of flat faces and conforming to the shape of the casing.

Having thus described my invention, I claim:—

1. In a tool of the character described, a metallic casing of elongated shape and provided with a plurality of exterior flat faces to provide flat bearing seats for the tool, and a stick of abrading material permanently enclosed in said casing and projecting from one end thereof, said casing being of a character adapting it to be ground away to expose the abrading material as it wears, the plurality of flat faces of the casing enabling the same to be turned and supported in different positions when in use to thereby permit the exposed end of the abrading material to wear equally on a plurality of sides and render the same self-sharpening.

2. In a tool of the character described, a metallic casing of tapering form provided at one end with a handle, a stick of abrasive material enclosed in said casing, said casing being formed with a plurality of flat faces with the end of the abrasive material projecting from the small end of the casing.

3. In a tool of the character described, a metallic casing of triangular shape, and a stick of abrading material enclosed therein, for the purpose specified.

4. In a tool of the character described, a metallic casing of triangular shape in cross-section and tapering from end to end, a handle secured to the large end of said casing, a stick of abrading material enclosed by said casing and of similar shape in cross section, for the purpose specified.

In testimony whereof, I have hereunto set my hand this 13th day of August, 1920.

HENRY MORRIS.

Witness:
CHAS. I. WELCH.